Dec. 23, 1969    L. A. PARSONS    3,485,279
TREATMENT OF ONIONS
Filed Nov. 4, 1966    12 Sheets-Sheet 5

INVENTOR
LESLIE ARTHUR PARSONS
BY Young + Thompson
ATTYS.

Dec. 23, 1969  L. A. PARSONS  3,485,279
TREATMENT OF ONIONS
Filed Nov. 4, 1966  12 Sheets-Sheet 6
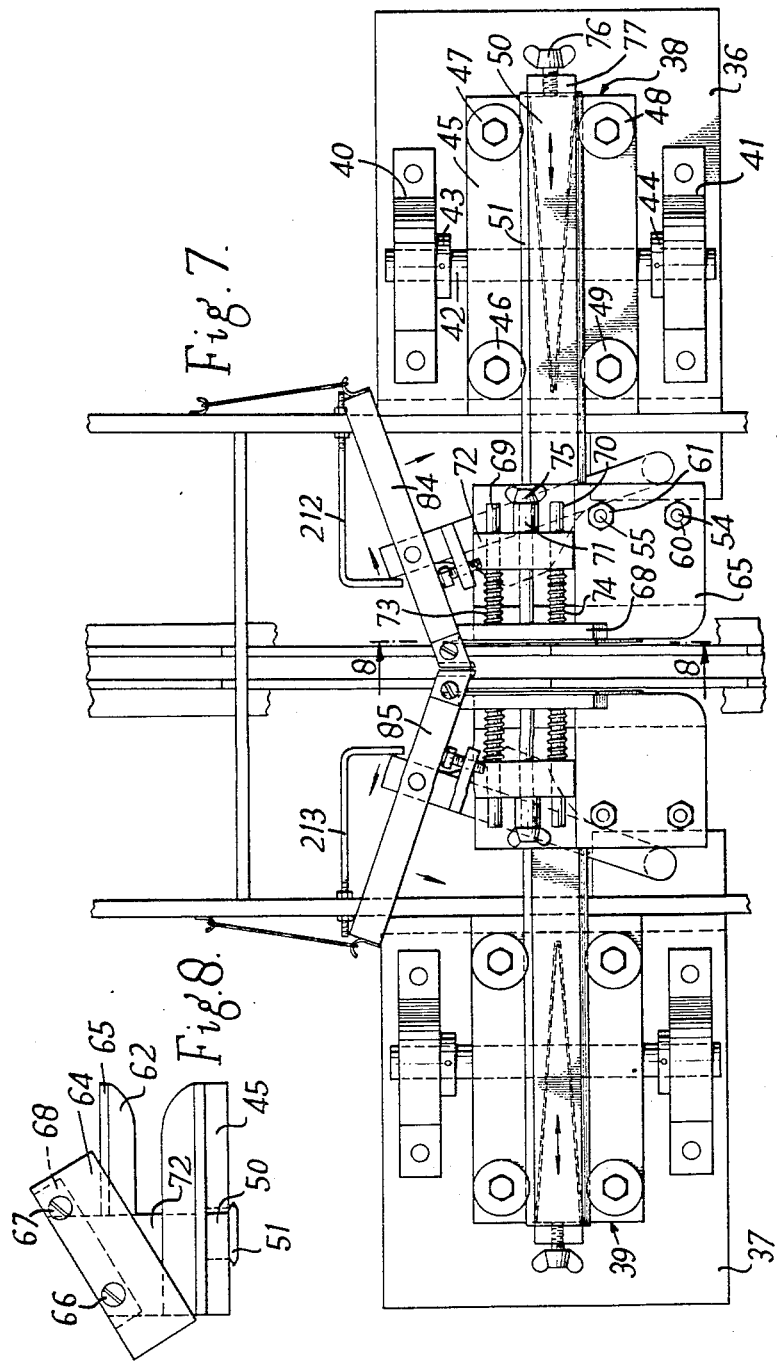
INVENTOR
LESLIE ARTHUR PARSONS
By Young & Thompson
ATTYS.

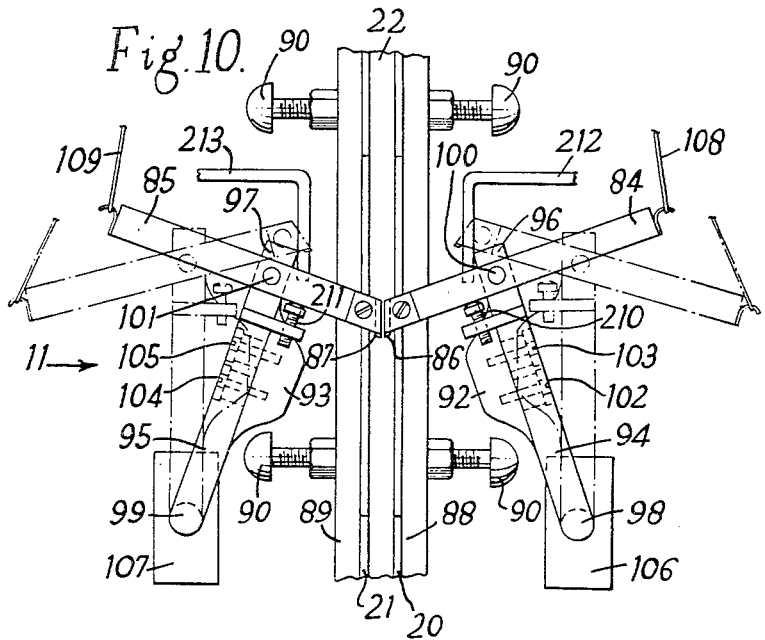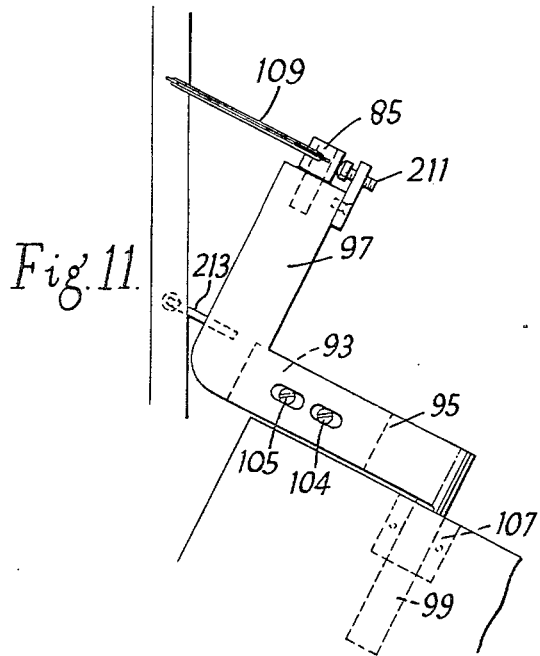

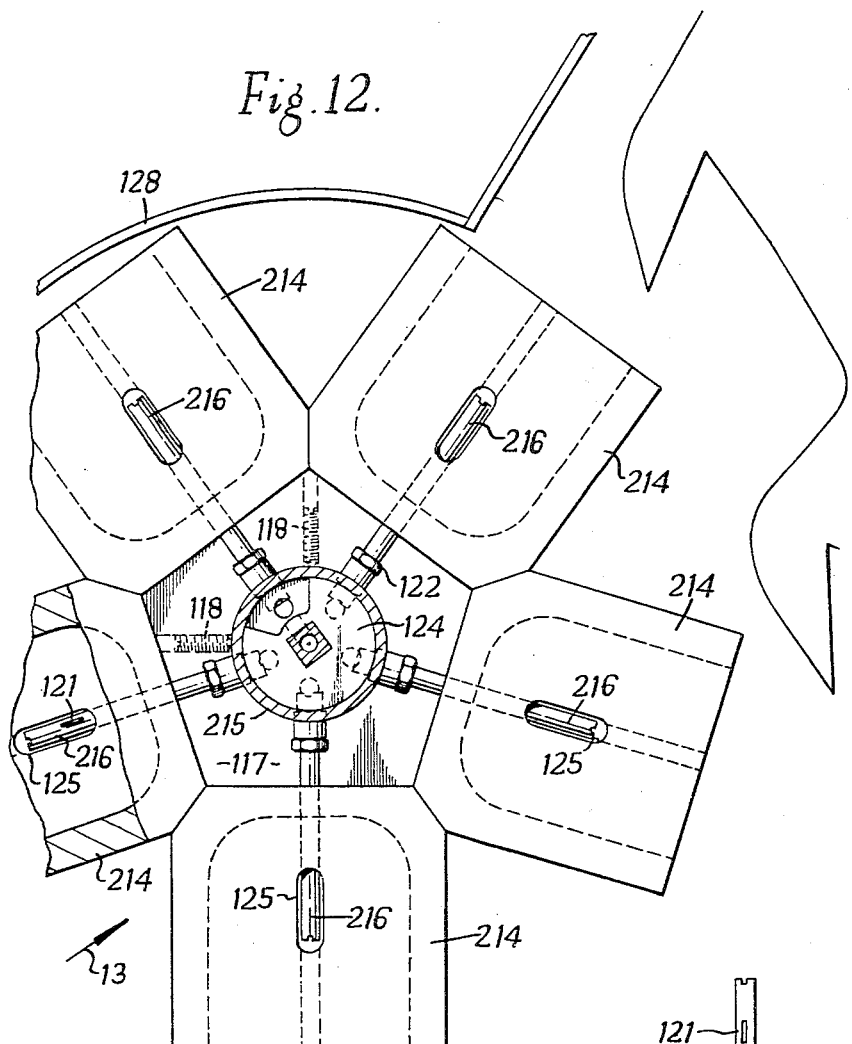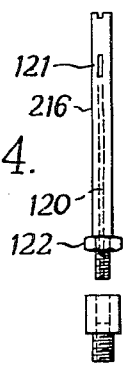

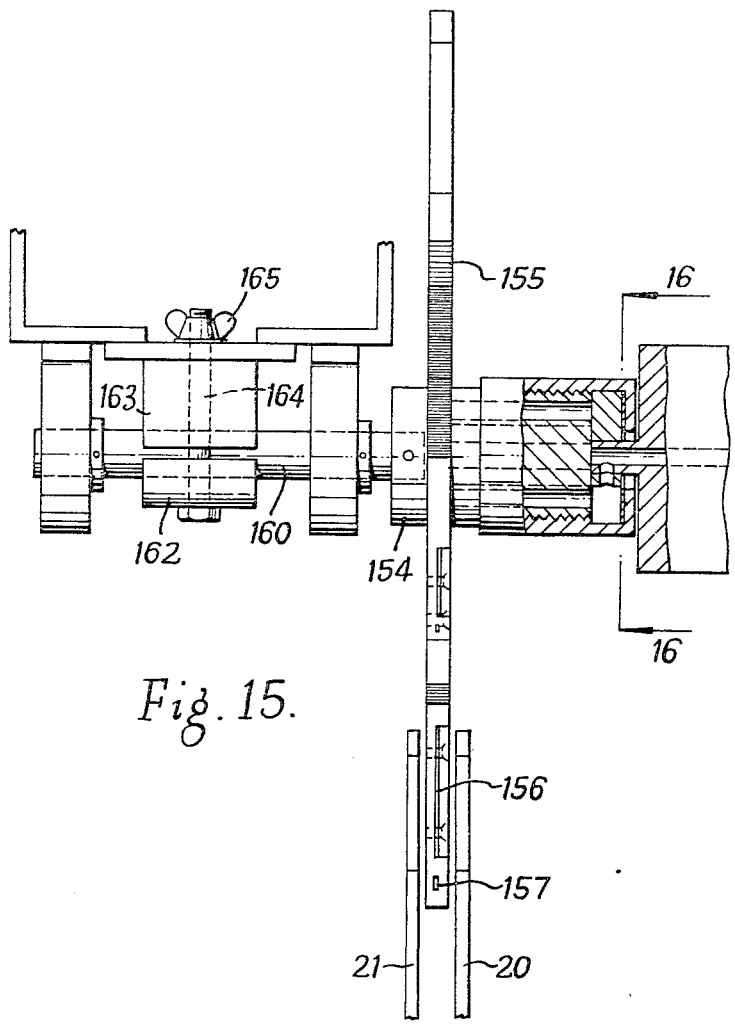

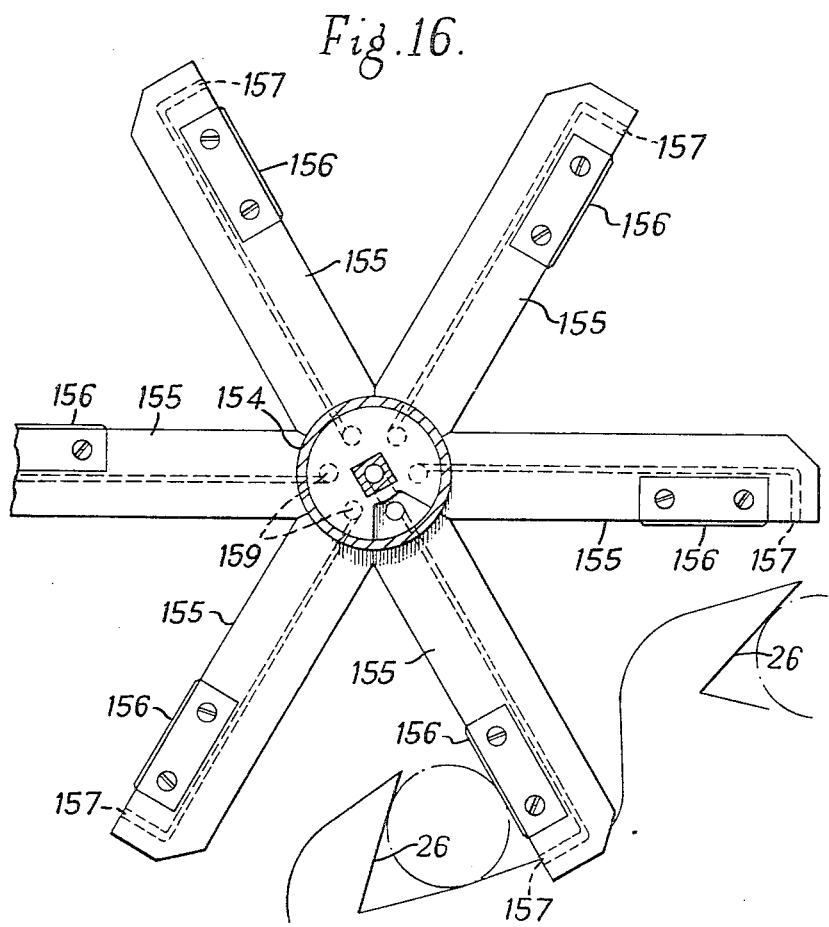

United States Patent Office 3,485,279
Patented Dec. 23, 1969

1

3,485,279
TREATMENT OF ONIONS
Leslie A. Parsons, Burry Port, Wales, assignor to
Leslie A. Parsons & Sons Limited
Filed Nov. 4, 1966, Ser. No. 592,033
Claims priority, application Great Britain, Nov. 26, 1965,
50,303/65, 50,304/65; July 4, 1966, 29,916/66
Int. Cl. A23n 7/00
U.S. Cl. 146—230
6 Claims

ABSTRACT OF THE DISCLOSURE

Onions have their skins removed by splitting the skins and then feeding them in timed sequence to a container in which they are subjected to a blast of air, the onion content being small in relation to the size of the container so that the onion(s) can move freely in the container under the influence of the air blast.

---

The present invention relates to the skinning of onions.
Common methods of treating onions are:

(a) Abrading the onions followed by treatment in a hot solution of caustic soda.

(b) Burning by passing the onions through a furnace heated to a high temperature with propane gas and oxygen and then removing the burnt skins or inedible layers by scrubbing either with brushes or passing through a continuous type abrasive vegetable peeler.

(c) Rotating in an abrasive drum similar in operation to a potato cleaner.

These methods suffer from a number of disadvantages in that they are relatively costly, inefficient, tend to damage the onions and in general are messy thereby creating uncongenial working conditions.

It is therefore an object of the present invention to overcome the above disadvantages in the common methods of treating onions.

According to the invention there is provided a method of removing skins and/or inedible layers of onions by placing each onion either alone or with one or more others into a container and subjecting the onion to a blast of fluid in the form of at least one stream of fluid entering the container which causes the onion to spin freely in the container thereby removing the skins and or inedible layers.

The fluid is preferably air but other fluids may be used, e.g. steam. If desired the onion may have its outer skin split by cutting, abrading or burning before being fed to a container in which it is submitted to a blast of fluid and spun around at high speed to remove one or more skins and/or inedible layers. A pressure of air of 60 to 100 lbs. per square inch is usually adequate but a reducing valve may be provided whereby the pressure can be speedily adjusted from any given maximum. The compressed air may be at ambient temperature.

Further according to the invention there is provided an apparatus for removing skins and/or inedible layers of onions, comprising a support structure, a container carried on said support structure and at least one nozzle provided in the wall of the container opening into the interior of the container, said nozzle being connected to a supply of fluid.

The apparatus for carrying out the invention may comprise a circular or approximately circular container having a nozzle provided in its annular wall through which a blast of compressed air can be projected into the container tangentially or along a chord of the circular wall. If desired more than one jet may be provided and/or the jet may have two or more openings. The supply of air to the jet may be supplied through a valve, e.g. a rotary

2 valve for controlling the period during which each onion is subjected to the air blast. The container may be cylindrical or may have a larger internal diameter between its ends so that the onions tend to remain in the large diameter part while being skinned. The onions will rotate about the axis of the container and also about their own axes and they tend to remain with their axes about parallel to the axis of the container so that the air blast is directed against the skin between the top and tail positions. The generatrix of the container may be a curve or may consist of two straight lines or two straight lines with another shape at their adjacent ends. The container may be of funnel shape at the top to facilitate introduction of the onions. While the cross section of the container is preferably a circle at all positions it could be of other shape, e.g. a polygon or oval.

The onions may be skinned before or after topping and tailing.

An onion may be slit in more than one place along its axis (top to tail), perpendicular to the axis and midway between the top and tail (i.e. around part or all the circumference) or obliquely to its axis by means of adjustable sharp knives or members having teeth, diamonds or other abrasive materials e.g. carborundum, or by burning to a depth of between say five and fifteen thousandths of an inch (e.g. seven thousandths of an inch) thereby ensuring that an onion with for example six skins of one thousandth of as inch thick will have all its skins slit. In the event of having to remove the outermost fleshly layer the depth of the slit may be increased to say one eighth of an inch. This may occur with onions having the innermost skin growing integrally with the outermost layer of flesh and in cases where the flesh is damaged. In practice the skins may be removed first and then the onion is recycled through another apparatus which removes the inedible fleshy layer or layers.

In a preferred embodiment of the invention, onions are continuously fed, one at a time, on to moving onion carriers which carry the onions successively into engagement with topping and tailing knives arranged in the path of the onions, and then into engagement with knives which slit the skins and/or inedible layers of the onion; the onion then being ejected from its moving onion carrier to be received into one of a plurality of containers where it is blasted with compressed air to separate the skins and/or inedible layers from the onion, the containers being brought successively to the onion receiving position.

If desired the onions may also be subjected to a jet of fluid at the slitting position. Further the onions may have their skins and/or inedible layers slit before or after topping and tailing.

Alternatively the onions may be slit and blasted by means of a hand operated device which incorporates a sharp knife and a nozzle or jet for blasting the slit with compressed air or other suitable medium. Then the onions may be topped and tailed by hand or mechanically and the loosened skins may be removed in a container or containers of the type disclosed in which the onion is again subjected to a blast of air or other suitable fluid and spun round at high speed.

The invention will now be described, by way of example, with reference to the accompanying drawings, wherein:

FIGURE 7 is a plan view of the topping and tailing knives and the knives for splitting the skins and/or inedible layers longitudinally;

FIGURE 8 is an end view of a knife and feeler of one knife assembly for topping and tailing onions as viewed from 8—8 on FIGURE 7;

FIGURE 10 is a plan view of the knives and mechanism for splitting the skins and/or inedible layers longitudinally illustrating a normal position in full lines and the actuated position in broken lines;

FIGURE 11 is a side elevation of the knife mechanism for slitting the skins and/or inedible layers longitudinally as viewed along the line in the direction of the arrow 11 on FIGURE 10;

FIGURE 12 is a cross section through a rotatable air blast skinning apparatus;

FIGURE 14 illustrates a jet for supplying compressed air to a container of the air blast skinning apparatus;

FIGURE 15 is an end elevation of a modified star wheel which serves to slit the onions around part of the circumference thereof whilst simultaneously blasting the slit with a compressed medium; and FIGURE 16 is a sectional view on the line 16—16 on FIGURE 15.

Figure 1:
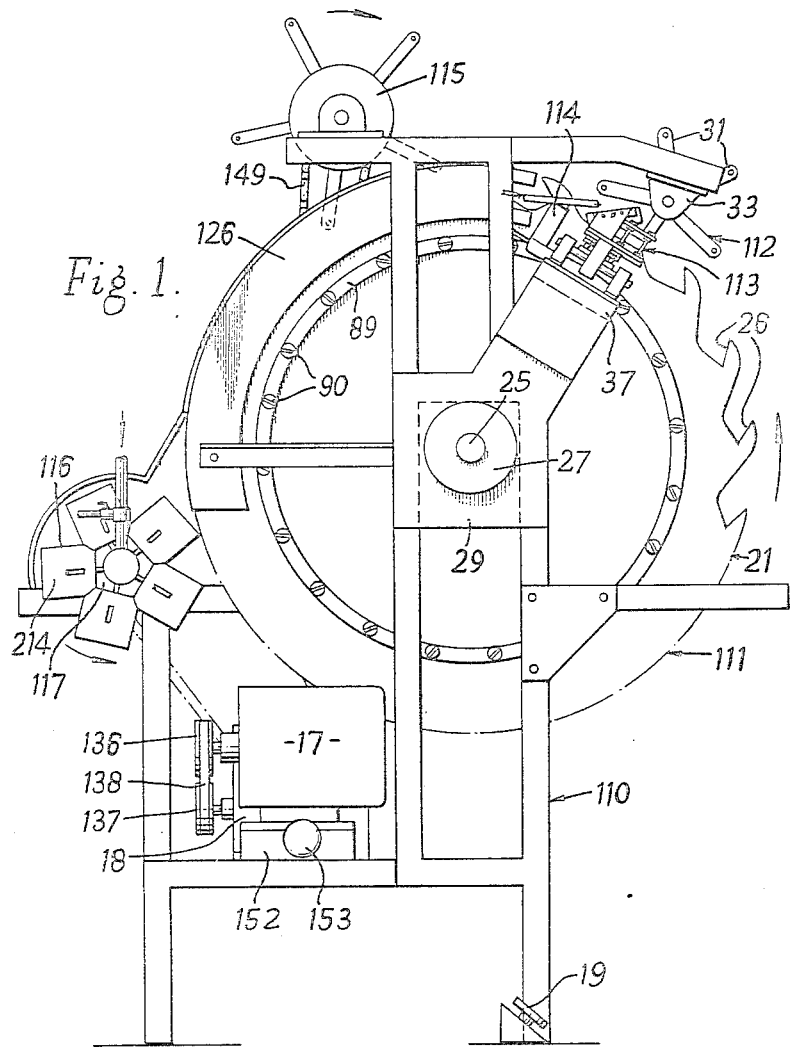
FIGURE 1 is a side elevational view of an apparatus made in accordance with the invention and operating in accordance with the method of this invention.
Figure 2:
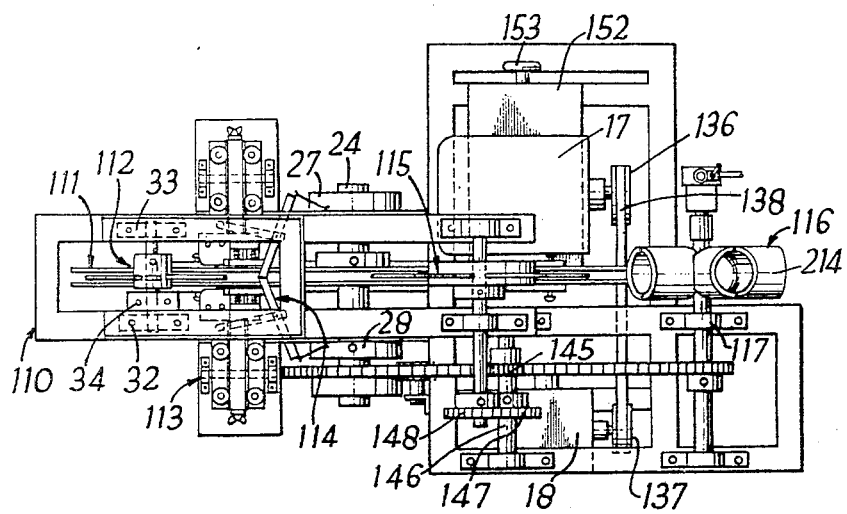
FIGURE 2 is a plan view thereof.

Referring to the drawings, the machine comprises a frame 110 made from, for example, lengths of angle iron bolted and welded together. Within the frame 110 is carried an onion carrier 111, a frictionally restrained star wheel 112, topping and tailing knives 113, knives 114 for slitting the skins and/or inedible layers substantially from top to tail, an ejecting star wheel 115, an apparatus 116 for air blast skinning of the onions, an electric motor 17 and a gearbox 18. To start and stop the machine a foot operated switch 19 is provided.

The onion carrier 111 comprises two approximately circular plates or discs 20, 21 which are fixed to a circular spacer member 23 so as to be parallel to each other and concentric with the spacer member 23. The spacer member 23, which may be between one-quarter to one-half inch thick, for example, three-eighths of an inch, is secured to a bush 24 for example by welding or screws, so as to be circular thereof. The spacer member 23 and the bush 24 have an axially extending hole provided in the centre thereof through which a drive shaft 25 can be located and to which the bush 24 is secured e.g. by grub screws so as to be rotatable therewith.

The periphery of each plate 20, 21 is cut out at intervals to form onion carrying notches 26. These notches 26 are shaped so that the apices of all the notches 26 fall on a common circle (pitch circle). The notches 26 are spaced evenly around the pitch circle e.g. twenty notches on a plate or disc of 24 to 30 inches diameter. Each notch 26 presents a V-shape viewed axially of the disc and the tangent to the pitch circle at the apex of the notch bisects the notch so that the edges of the notch lie on opposite sides of the line of travel presented by the pitch circle, one edge being nearer to the axis of the discs 20, 21 than the other. The result of this is that the onions irrespective of size always have their axes on but transversely across this pitch circle. The angle of the V-notches 26 may be between 30° and 90°, for example 45°. The direction of rotation is such that the wide open end precedes the apex.

The onion carrier 111 is mounted vertically about the shaft 24 which is horizontally supported in bearings 27, 28. The bearings 27, 28 are secured to steel plates 29, 30 secured, for example, by welding to upright members of the frame 10.

Figure 6:
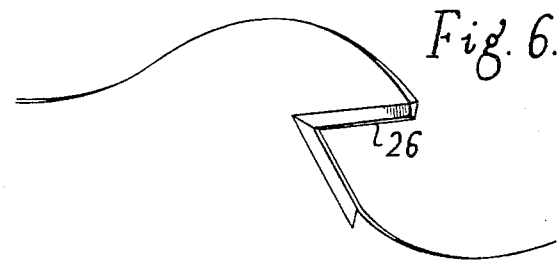
FIGURE 6 is a perspective view showing one V-shaped notch and showing the chamfering on the inner corner edge thereof.

The inner corner edges of the V-notches may be chamfered to provide V-seatings for the onions (FIGURE 6). For large onions the circular plates 20, 21 may be set further apart, e.g. 1.5 to 2.0 inches and may have a less number of carriers.

The onion carrier 111 is rotated by means of a chain and sprocket drive from the electric motor 17 to be described in detail later.

Onions may be fed, one at a time, onto each pair of notches 26 at the side where the open end is vertically above the apex. An operator ensures that the top and tail of each onion are set horizontal. Means for feeding onions to the notches may be provided, for example, a chain feed device which conveys the onions to the notches by gravity from a hopper or by a vibrating feeder device.

Each onion is carried by the circular discs 20, 21 through an angle of about 60° of rotation to an arm of the star wheel 112. The arms (e.g. five arms) 31 of the star wheel 112 successively enter between the discs 20, 21 and can serve a twofold function in that they are a means for holding the onion firmly in the notches 26 as it is being topped and tailed and also they can be operated as a counter.

The star wheel 112 is carried on a horizontally arranged shaft which is supported in bearing blocks 32, 33; the bearing blocks 32, 33 being secured e.g. by screws to the frame 110 of the machine. The star wheel 112 is restrained frictionally against free rotation by means of two blocks 34 for example made from a resin bonded laminated material. One block, which is secured to the frame 110 of the machine, has a shallow groove formed in the bottom surface thereof; in which the shaft of the star wheel is located; and the second block which has a corresponding groove provided in one surface thereof, is placed over the shaft of the star wheel 112 so that the groove provided thereon rests on said shaft and is clamped thereon by means of screws passing through said blocks and nuts. By adjusting the relative position of the nuts on the screws the degree of clamping may be set as desired.

The notches 26 push the onion against an arm 31 and rotate the star wheel 112, which is restrained frictionally against free rotation as above described so that the onion is pressed firmly into its respective notches 26. The onion is almost immediately carried by the rotating discs 20, 21 to the topping and tailing knives 113.

Figure 9:
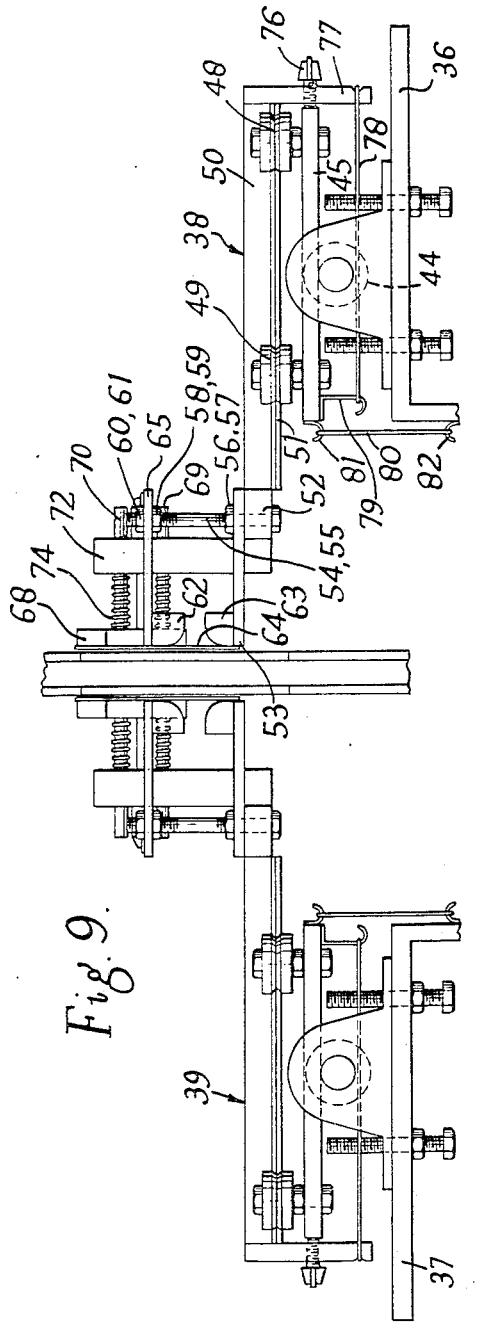
FIGURE 9 is an end view of the topping and tailing knives illustrated in FIGURE 7.

The topping and tailing knives 113 (FIGURES 7, 8, 9) are supported on L-shaped brackets 36, 37 arranged either side of the machine. The brackets are secured e.g. by bolts to extensions of the plates 29, 30 (FIGURES 1 and 3) so that they extend radially from the axis of the onion carrier 111 at an angle of, for example, 30° to the perpendicular extending through said axis. Each bracket 36, 37 comprises an upright member and a laterally extending member at right angles to each other. The plane of the laterally extending member is at an angle of, for example, 30° to the horizontal.

Knife carrying devices 38, 39 which are identical to each other, are carried on the laterally extending members of the brackets 36, 37. For convenience of description the knife assembly 38 will be described in detail but it is to be understood that the description applies equally to the knife assembly 39.

The knife assembly 38 comprises two bearing blocks 40, 41 secured by, for example, screws and nuts to the laterally extending member of the bracket 36. A spindle 42 is located in the bearings 43, 44 of the blocks 40, 41 so as to be able to rock about its axis. The bearings 43, 44 are provided with grub screws which bear on the spindle 42 to prevent any axial movement of said spindle 42. A rectangular plate 45 is secured, e.g. by welding, tangentially to the spindle 42. Four pairs of rollers 46, 47, 48 and 49 are secured, e.g. by bolt and nut, to the plate 45 so as to be able to rotate reciprocally about a mean position. The adjacent peripheral edges of each pairs of rollers are chamfered so that when each pair of rollers is assembled, an annular groove of V-shape cross section is formed. A slide bar 50 formed of a metal or plastics material or rectangular cross section has a member 51 secured e.g. by screws to the underside thereof. The member 51 which is made of metal e.g. steel, has a rectangular profile with a length equal to that of the slide bar 50. The longitudinal edges of the member 51 are ground and hardened to form knife edges of V-shape, the angle of the apex of the knife edges corresponding to that of the V-shaped annular groove of the two-part rollers 46, 47, 48 and 49. In order to ensure that the member 51 when attached to the slide bar 50, is correctly carried by the rollers, i.e. to ensure that there is no free play between the knife edges and the annular grooves of the rollers, two of the rollers, 46, 47 or 48, 49 are eccentrically mounted so that the particular pair of rollers can be rotated about their axes until there is no free play between the knife edges and the annular grooves. The rollers are then fixed in position.

A bracket 52 (FIGURE 9) in the form of a rectangular bar is secured at right angles to the end of the slide bar 50. A substantially rectangular plate 53, which is attached by bolts 54, 55 and into 56, 57 respectively to the bracket 52, is provided to support upper and lower guide blocks 62, 63 and a knife blade 64. The lower guide block 63 is secured along the upper side of the free edge of the plate 53 and the upper guide block 62 is secured to the underside of a plate 65. The plate 65 and the guide block 62 are shorter in length than the plate 53 and the guide block 63 respectively. The plate 65 with guide block 62 is carried on the plate 53 by means of the bolts 54, 55 and nuts 58, 59 and 60, 61 respectively. The guide blocks 62, 63 are mounted parallel to each other so that they are arranged above and below a tangent to the pitch circle and constitute a feeler the entrant surfaces of which are chamfered in two directions to form a flared inlet between them so that the tops and tails of the onions run between the guide blocks. The distance between the guide blocks 62, 63 may be adjusted by turning the nuts 58, 60 on bolt 54 and the nuts 59, 61 on bolt 55 in the desired direction. The knife blade 64 is secured, for example, by screws 66, 67 to a rectangular block 68. The block 68 has three studs 69, 70, 71 secured thereto and extending at right angles therefrom. The studs 69, 70 have plain shanks whereas the stud 71 is threaded along part of its length.

The knife blade 64 is mounted at an angle across the pitch circle, i.e. at an angle of, for example, 30° to the plane of the plate 53 which is parallel to a chord of the pitch circle, and is supported by an upright support member secured at right angles to the bracket 52. The free end of the support member 72 is cut at an angle corresponding to the angle at which the knife blade 64 is mounted with respect to the plane of the plate 53 for example, 30°. The support member 72 has three holes provided therein in positions corresponding to the studs 69, 70, 71 so that when the studs are inserted in said holes, the back or non-cutting edge of the knife blade 64 is in line with the free end of the member 72. The holes corresponding to studs 69, 70 are a sliding fit on the studs whereas the hole corresponding to stud 71 is a clearance hole.

In order to maintain the distance between the knife blade 64 and the support member 72 constant, compression springs 73, 74 are provided on studs 69, 70 respectively so that when the studs 69, 70, 71 are inserted in their respective holes in the support member 72, the springs 73, 74 when compressed urge the block 68 with the knife blade 64 away from the member 72. A nut 75 is provided on the threaded portion of the stud 71 which serves to limit the movement of the block 68 away from the support member 72 and also provides a means for adjusting the distance between the knife blade 64 and the feeler constituted by guide blocks 62, 63 thereby permitting a lesser or greater amount to be cut from the ends of the onions.

The position of the slide bar 50 together with the guide blocks 62, 63 and the knife blade 64 may be bodily adjusted with respect to the onion carrier 111 by means of a screw 76. The screw 76 passes through a threaded hole, provided in an abutment member 77 which is secured, for example, by means of screws to the end of the slide bar 50, and bears against the edge of the plate 45. By turning the screw 76, for example, clockwise the slide bar 50 together with the guide blocks 62, 63 and the knife 64 are moved away from the onion carrier 111, whereas by turning the screw 76 in the opposite direction, the slide bar 50 moves towards the onion carrier 111. The adjustment of the relative position of the knife blade by nut 75 usually is effected by a corresponding adjustment to the relative position of the slide bar by screw 76.

A resilient means 78, e.g. a tension spring or an elastic band is provided in order to urge the slide bar 50 towards the onion carrier 111. The resilient means 78 is connected between the abutment member 77 and an abutment 79 attached to the underside of plate 45.

The slide bar 50 is resiliently restrained by a resilient means 80, e.g. a tension spring or elastic band connected between an abutment 81 attached to the end of the plate 45 and an abutment 82 attached to the upright member of the bracket 36, against a stop (not shown) so that an off-centre top or tail can displace the feeler and the knife blade up or down radially of the discs 20, 21, i.e. traversely across the notches.

The adjustment of the guide blocks 62, 63 from their opposed positions e.g. to allow for an increasing or decreasing gap to allow a top or tail to protrude more or less, and the adjustment of the knife allows for practically any desired cut to be affected.

The leading corners of the knife blades may be bent away from the plane of the knife blade to ensure a smooth entry of the discs 20, 21 between the knife blades or to allow for any misalignment.

In operation the onion carrier 111 carries the onion to the guide blocks or feelers. The tops and tails pass between the feeler blocks and the latter engage the shoulders of the onion. The pairs of blocks are pushed apart by the onion so as to adjust the positions of the topping and tailing knives according to the axial length of the onion between its shoulders. At the same time the onion adjusts each pair of feeler blocks heightwise of the onion according to the shape of each end if the onion is offset from its main axis. The onion is topped and tailed.

After the onion has been topped and tailed it is carried by the onion carrier 111 into the path of two arms 84, 85 carrying knives 86, 87 supported on either side of the rotating plates so that they move reciprocally into and out of the path of the onion carrying notches 26 (FIGURES 7, 10, 11). The arms are so aligned that the knives lie preferably on the pitch circle of the onion carrier 111. Alternatively they may be aligned above or below the pitch circle depending on the type of longitudinal slit desired. In the present embodiment of the invention, each arm has two knives arranged parallel to each other and spaced for example fifteen thousandths of an inch apart. The knives 86, 87 may project from the arm by a distance of between seven and fifteen thousandths of an inch. As an onion engages the arms 84, 85, the knives 86, 87 slit the skins and/or inedible layers thereof in a longitudinal direction from the middle outwards whilst at the same time the arms themselves are moved outwards to avoid contact with the onion carriers.

One form of actuating mechanism comprises two identical rings 88, 89 of square or rectangular cross section, one attached to the outside of each rotating plate 20, 21 and arranged coaxially thereof. Each ring has an outside diameter which is less than that of the pitch circle of the onion carrier 111 e.g. by four inches. On each ring there is provided, for example, twenty round headed studs 90, i.e. one per onion carrier, projecting outwards at right angles from each ring. The studs are spaced equidistant from each other and each lies on a radial line extending midway between the wide open ends of adjacent V-shaped onion carriers. When the plates 20, 21 rotate the studs, in turn, engage upon two cams 92, 93 pivotally carried on either side of the plates. Each cam 92, 93, which is of a substantially truncated V-shaped profile and made from materials such as steel or a resin bonded laminate material is attached to a support member, each member being of L-shape having a laterally extending limb 94, 95 and an upright limb 96, 97 arranged at right angles. To the free end of each laterally extending limb 92, 93 spindles 98, 99 are attached extending away from said upright limbs 96, 97 and parallel thereto. The arms 84, 85 carrying the knives 86, 87 attached to the top of the upright limb of each support member so as to be rotatable about its own means of attachment 100, 101 e.g. stud, bolt. The cams 92, 93 are attached by means for example, of screws 102, 103 and 104, 105 respectively, to the laterally extending limb of each support member so that as the studs ride over its truncated V-shaped surface the support member and arm are moved reciprocally into and out of the path of the rotating onion carriers.

The spindle 98, 99 of each support member is received in bearing blocks 106, 107 made from, for example, a resin bonded laminate material or a metal, and having holes drilled therein attached to the frame or fixed part, for example blackets 36, 37 of the machine so that the laterally extending limb of the support member points in the direction of rotation of the onion carrier 111 and the knives lie on the pitch circle thereof. The arms are arranged so that the knives 86, 87 face the oncoming onions. In operation the knives 86, 87 are moved in a plane coincident with or parallel to a tangent drawn to the pitch circle at the point of contact of the knives with the onion. In order to ensure that the knife or knives in each arm can exert a cutting force on the skin of the onion, a tensioning means 108, 109 e.g. a spring or rubber band, is attached between the free end of each arm 84, 85 and a fixed part of the machine, which urges the arm in a direction towards the apex of the V-shaped notches. This allows the device to compensate for the variation in the sizes of onions. To limit the movement of each arm towards the apex of the notches, adjustable stops 210, 211 carried on brackets attached to the free ends of the upright limbs 96, 97 of the support member. The arms bear against these stops at a point between the pivots 100, 101 and their respective knives 86, 87. By adjustment of each stop 210, 211, the correct angle of the cutting arms can be set, i.e. when the arms are in an operative position they form a letter V the apex of which has an angle of between 145°–175° e.g. 165°. The tensioning means 108, 109 may also serve a second function which is to urge the arms towards each other to restore them to normal positions after they have been forced apart by the cams 92, 93 being engaged by the studs 90 as the plates 20, 21 rotate.

To ensure that the support members do not abut the rotatable plates 20, 21, L-shaped adjustable stops 212, 213 are provided on each side of the machine. One limb of each stop 212, 213 is threaded and passes through a hole provided on the frame of the machine, and the other limb of each stop is arranged to project, substantially horizontally, in the space between the upright limb of the support member and the rotating plates. The relative position of each stop 212, 213 is set by means of locking nuts provided on the threaded portion so that the arms are permitted to assume their desired position of just touching each other and at the same time the support members cannot abut the rotatable plates.

As the onion carrier 111 rotates, the knives 86, 87 on the arms 84, 85 are engaged upon the onion as the carrier continues to rotate the knives 86, 87 cut into the onion. The knives and arms are pushed from the path of the moving onion thereby increasing the tension of the tensioning means. Shortly after the blades are engaged by the onion, the studs 90 engage upon the cams 92, 93 to urge the arms 84, 85 away from the onion carrier, i.e. by pivoting each support member outwards in its bearing, and thereby the knives are drawn across the onion from the middle to the ends. The studs then push the arms clear of the plates forming the onion carrier. As the rotation of the plates 20, 21 continues the studs ride along the second sloping face of each of the truncated V-shaped cams 92, 93 which permits the arms 84, 85 to move towards each other under the influence of their respective tensioning means 108, 109 until each support member bears against its respective adjustable L-shaped stop 212, 213.

Several adjustments may be made to the slitting mechanisms in order to get the desired performance in the slitting of the onions. These include the previously mentioned adjustable stops 210, 211 for the arms and adjustable L-shaped stops 212, 213 for limiting the movement of the arms towards each other. The number of cutting knives may be varied and the depth of cut may be adjusted. The cams 92, 93 are made adjustable along the laterally extending limb of each support member and if necessary may be readily replaced by cams of the same profile, if the former cams become worn, or of different profile to be consistent with any changes made in the shape and size of the V-shaped notches, alternatively the studs can be threaded so that their depth of projection from the ring may be varied.

It is appreciated that although only one example of the mechanism for slitting the onion from top to tail has been particularly described, it is within the scope of the present invention that a person skilled in the art may devise alternative means for actuating the knives, e.g. by actuating means driven from the main drive shaft of the rotating plates or from the shaft of the ejecting star wheel 115.

After the skins and/or inedible layer of the onion have been split it is carried round to a position where it is ejected from the onion carriers either under the influence of gravity or by an ejection means formed by a spider wheel 115 having a plurality of prongs, e.g. five. The axis of the spider wheel 115 is arranged to be remote from the notched plates 20, 21 forming the onion carrier 111, but is parallel with the axis of the onion carrier 111. The prongs of the spider wheel are arranged to pass between the notched plates 20, 21 defining the onion carrier and are timed by a suitable drive means e.g. a chain and sprocket drive from the electric motor 17 to be described in detail later to eject the onion from the onion carrier 111, thereby allowing it to fall into one of a plurality of containers 214 comprising part of the apparatus 116 for removing the skins and/or inedible layers thereof under the influence of compressed air, steam or other gaseous medium or a fluid medium, under pressure.

Figure 13:
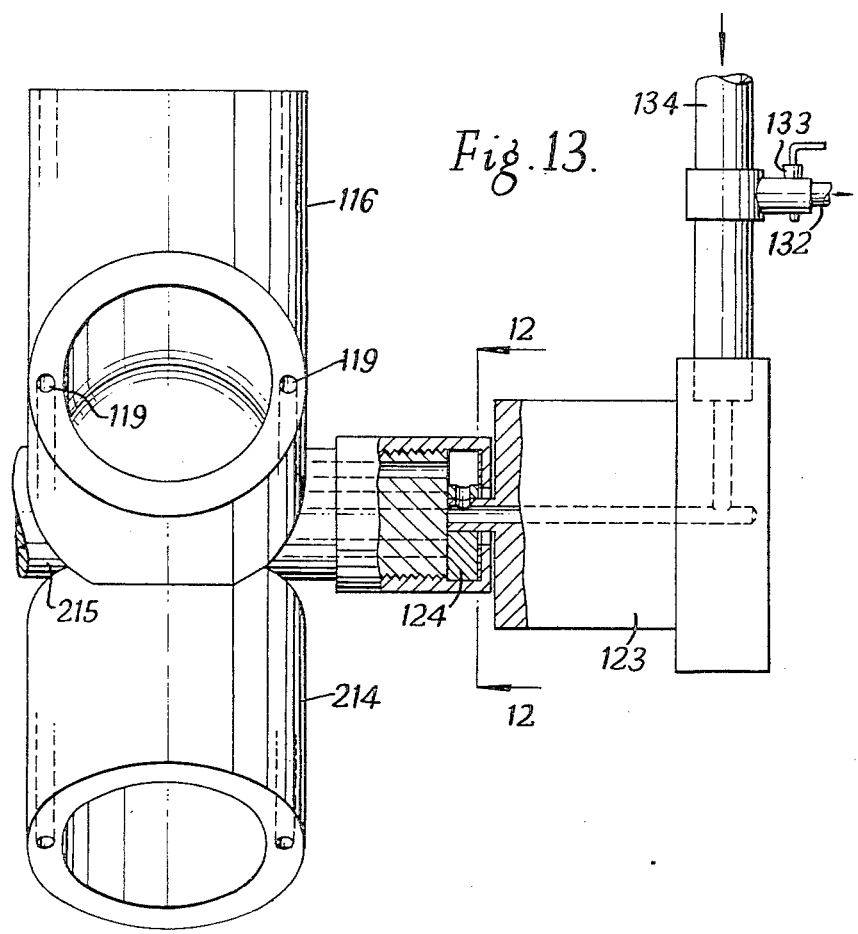
FIGURE 13 is an elevation of the air blast skinning apparatus as viewed in the direction of the arrow 13 on FIGURE 12.

In a preferred construction (FIGURES 12, 13) the apparatus 116 comprises five containers 214 arranged with their axes pointing radially outwards around a horizontally arranged axle 215, said axle 215 being rotated about its axis by, for example, a chain and sprocket drive means, the electric motor 17. Each container 214 is cylindrical in shape having a circular cross section and with a straight sided wall and curved bottom. For dealing with onions of between 20 and 45 mm. diameter, each container may be 2.4 to 2.8 (e.g. two and five eighths) inches diameter, and 2.3 to 2.7 (e.g. 2.5) inches deep. The wall of each container may be smooth. Two holes 119 are drilled in diametrically opposite positions in the wall of each container parallel to the axis thereof, the diameter of the holes being a clearance fit on nozzles 216 which are inserted therein. The containers 214 are secured e.g. by screws (not shown) to a pentagon shaped bush 117, so that a plane through the holes 119 in each container is radial of the bush and parallel to the axis of the bush 117. The pentagon shaped bush 117, which is secured to the axle 215 by means of grub screws 118, has a thickness less than the distance between any one pair of holes 119.

One end of the axle 215 has five axially extending bores in circular array each of which connects with two outwardly extending radial bores which break through the circular surface of the axle 215 in positions corresponding with the holes 119 of each container 214. Each outwardly extending radial bore has a thread cut in the surface thereof into which the nozzles 216 having a corresponding thread provided on one thereof, may be screwed.

Each nozzle 216 comprises a tubular body having a hole 120 drilled off centre of but parallel with the axis of the tubular body. Said hole 120 terminating in a rectangular, parallel sided slot 121 extending radially through the axis of the tubular body to the circular surface thereof. The non-threaded end of each nozzle 216 has a screw driver slot provided therein in order to facilitate positional adjustment (i.e. height and direction) of the nozzle. Further, longitudinal slots 125 are provided extending through the portions of the wall adjacent the nozzles 216, by which said positional adjustments of the jets may be facilitated. In order to lock the jet in its desired position a lock nut 122 is provided on the threaded end of each jet.

Said one end of the axle 215 is flat and over which is fixed a rotary valve 123 which is supplied with air (at a pressure of 50 to 100 lbs. per square inch) or other suitable fluid and contains a flat disc 124 which is pressed by a spring (not shown) against the flat end of the axle. The disc 124 however is cut out to form an aperture extending 72° over the path of axially extending bores in the axle 215. Thus as the axle rotates compressed air is successively admitted to the bores during 72° of rotation and shut off from the compressed air during the remainder of the rotation. The disc may have its opening adjustable or the disc may be replaced by an opening of a different size, thus allowing a blast of compressed air to be emitted from the nozzles 216 over any specified angle of one revolution.

In operation, the onions, which have been topped and tailed and had their skins and/or inedible layers slit from top to tail, are timed, by means to be described later, to be fed singly into the rotating containers 214 when the latter are about 45° from the vertical. As each container passes the vertical position, the onion therein is blasted with compressed air emitted from the nozzle 216 through an angle of rotation of 72°, which causes the onion to spin freely, be vibrated or be caused to behave erratically depending on the direction of the jets of air from the nozzles, to separate the skins and/or inedible layers from the edible portion of the onion. The skins and/or inedible layers and the onion fall from the container after it has rotated through an angle of between 150° and 180° from the vertical, on to a device for disposing of the onion skins.

In order to ensure proper synchronization between the onions ejected from the onion carrying notches and the rotating containers and to direct the onions into their respective containers a stationary two part curved track 126 is provided to enclose a part of the circumference of the plates forming the onion carriers.

Each part of the track 126 comprises a part-circular side wall manufactured from suitable sheet material e.g. aluminium or plastics and a length of angle material attached to the side wall and extending around the outer edge of the side wall i.e. the edge having the larger radius of curvature. The two parts of the track are mounted to the frame 110 of the machine so as to define a gap of say three eighths to one half inch wide between the adjacent surfaces of the angle material. The gap serves two functions, one is to permit the prongs of the ejecting star wheel 115 to interpose between the onion carrying notches to eject the onion and second is to observe the workings of the machine. On the inside of the side walls of the track, guides or guards are provided extending the length of the track to prevent small onions from being trapped in or falling from the spaces between said side walls and the plates forming the onion carrier 111. The guides are attached to the side walls in a position corresponding to the pitch circle of the onion carriers and each having one side sloping inwards e.g. at an angle of 45° thereto leaving a small clearance gap e.g. of one eighth of an inch therebetween. Once the onion is ejected from its notches 26 it is retained in the space defined by successive pairs of notches until it is desired to release the onion so that it may pass on to the skinning machine. The desired position to release the onion from the top and tailing machine is when the onion has been carried to just below the horizontal plane.

The track 126 extends from a position after the slitting devices 114, in the direction of rotatioin, to beyond the point where the anion is released to pass into the skinning apparatus. In addition a shaped cover 128 is provided to enclose part of the circular path of the containers 214, said cover extending from the track 126 around said circular path and terminating at a point about 60° below the horizontal plane extending through the centre of the axle 215.

The part of the track extending from the release point of the onion is preferably formed by a separate end member (not shown) comprising a length of channel-sectioned or V-shaped sectioned material having a flat base portion of sufficient width to extend across the two part track, and two parallel side walls extending from the base portion of the channel sectioned material. Each side wall is provided with an elongated slot through which a screw may pass to attach the separate end member to the end of the two part track 126. The elongated slots serve to permit the separate end member to be bodily adjusted or swivelled about a mean position.

The separate end member serves to ensure proper synchronization between the onions leaving the onion carrier 21 and the containers of the skinning apparatus. The synchronization is achieved by moving the separate end member about its mean position so that an onion about to be released is not permitted to leave the topping and tailing machine until the precise moment, that is the plate is arranged in a predetermined position so that until there is a sufficiently large gap the onion cannot pass from the space defined by adjacent onion carrying notches 26 and the track 126.

Figure 3:
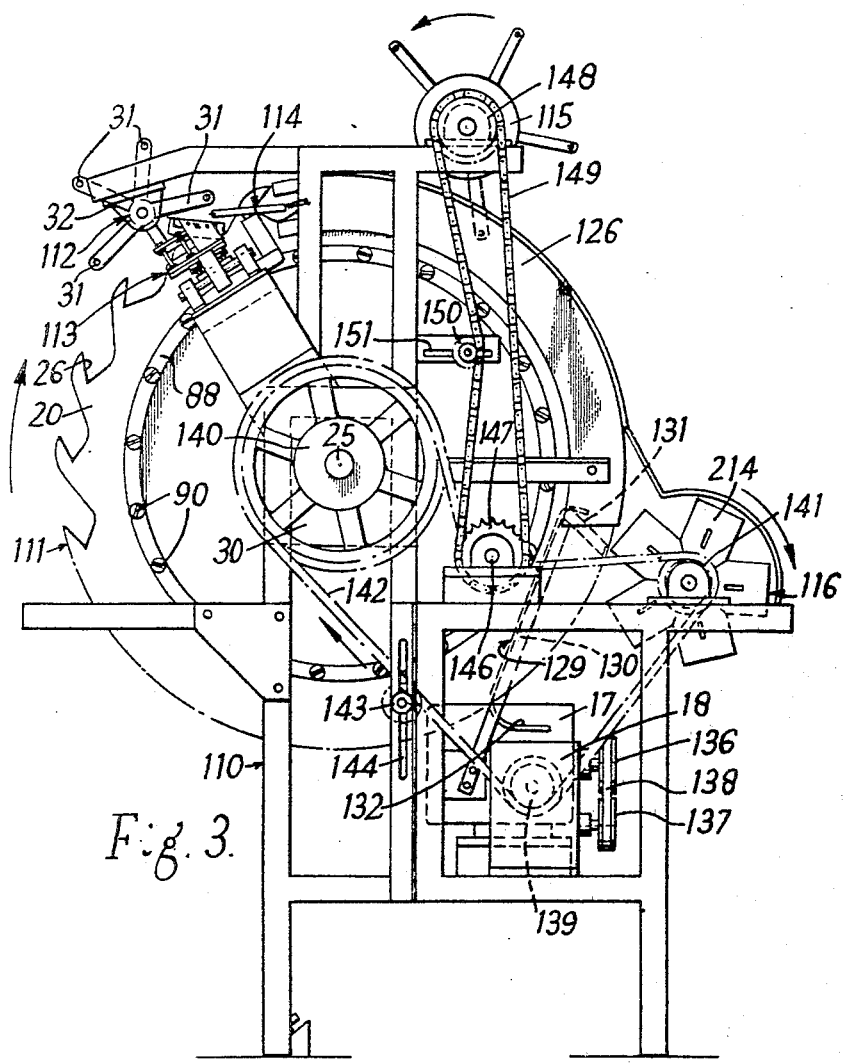
FIGURE 3 is a side elevation viewed from the side opposite to that shown in FIGURE 1.
Figure 4:
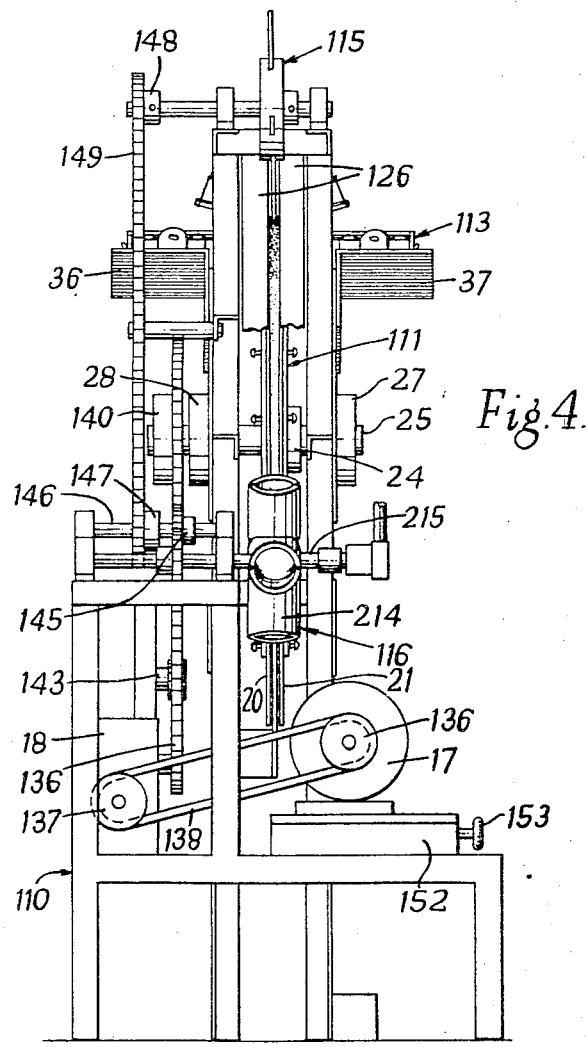
FIGURE 4 is a rear elevation.
Figure 5:
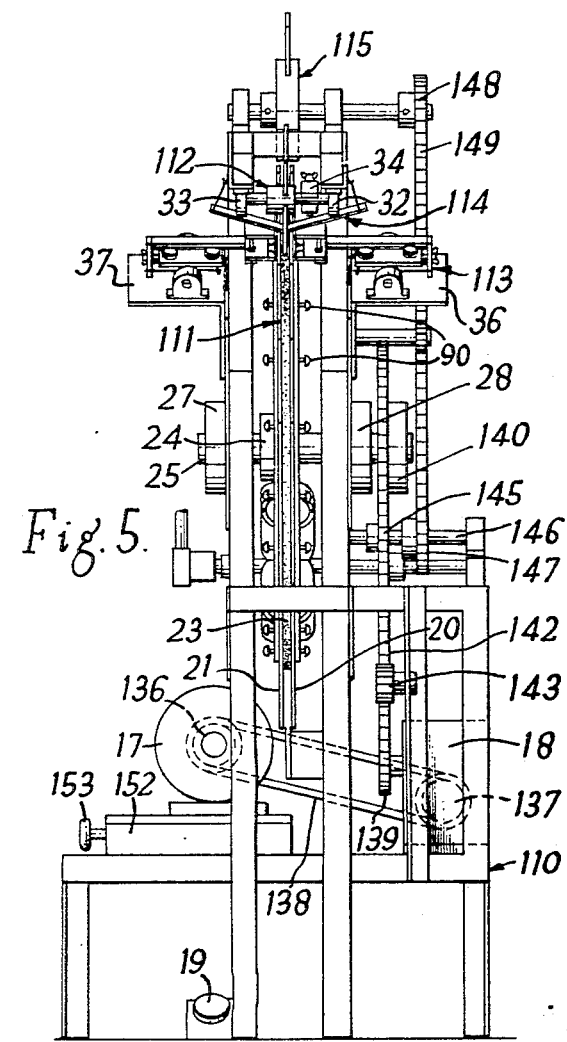
FIGURE 5 is a front elevation.

To direct the onions positively into the containers a guide 129 is provided (FIGURE 3). The guide 129 is V-shaped having one limb 130 longer than the other 131 of suitable section e.g. rectangular and is secured to the frame 110 so as to pass between the plates 20, 21 forming the onion carrier. A length of tubing 132 is secured to the guide 129 so as to extend along the limb 130, the tubing then passing over the apex of the V and being terminated about one third of the way along limb 131, the end of the tube 132 being formed into a nozzle. The other end of the tubing being connected to a valve 133 coupled into the main compressed air feed 134.

The guide 129 is arranged so that as the onion is released from the onion carrier 111, instead of falling vertically to the containers, it is guided along the limb 131 of the guide 129 whilst at the same time it is blasted with compressed air from the tubing 132 which directs the onion into the container 214.

The drive means for the machine comprises an electric motor 17 secured to the frame 110 of the machine. The shaft of the electric motor 17 has a pulley wheel 136 provided thereon which is operatively coupled by a V-belt 138 to a pulley wheel 137 provided on an input shaft of the gearbox 18. Sprockets 139 (e.g. having 19 teeth), 140 (e.g. having 76 teeth), 151 (e.g. having 19 teeth) are provided on an output shaft of the gearbox 18, the shaft 25 of the onion carrier 111 and the axle 215 of the air blast skinning apparatus 16 respectively, which are interconnected by a chain 142. The input and output shafts being at right angles to each other. A chain tensioning sprocket 143 is provided which is adjustable along the length of a vertical slot 144 provided in an upright frame member.

A secondary drive is taken from the chain 142 which serves to drive the ejecting star wheel 115. The secondary drive is taken from the chain 142 by a sprocket 145 (e.g. having 19 teeth) which is secured to a common shaft 146 with sprocket 147 (e.g. having 25 teeth), the shaft 146 being rotatable in bearing blocks secured to the frame 110 of the machine. A sprocket 148 (e.g. having 25 teeth) is provided on the shaft of the ejecting star wheel 115 and which is operatively coupled to the sprocket 147 by a chain 149. A chain tensioning sprocket 150 is provided which is adjustable along the length of a slot 151 provided in a horizontal frame member.

To obtain a variable gearing between the electric motor 17 and the gearbox 18, the pulley wheel 136 is of split-V type and the electric motor is mounted on a base member 152, which is secured to the frame 110 of the machine so as to be movable towards and away from the gearbox 18. The movement of the motor 17 is affected by a screw 153 which engages in a thread provided in the base of the electric motor 17. By rotating the screw, for example, in a clockwise direction, the electric motor 17 is moved away from the gearbox 18 and in so doing the V-belt 138 forces the sides of the split-V pulley wheel 136 apart so that its effective diameter is smaller thereby reducing the gearing ratio. Alternatively if the electric motor 17 is moved closer to the gearbox 18, for example, by turning the screw 153 anticlockwise, the effective diameter of the pulley wheel 136 is increased thereby increasing the gearing ratio.

The machine illustrated in FIGURES 1 to 5 may be adapted to split the skins and/or inedible layers around part or all of the circumference of the onion by cutting whilst at the same time blasting the slit with a fluid to loosen the skins and/or inedible layers.

In order to do this the star wheel 112 is replaced by a modified star wheel 154 (FIGURES 15, 16) and the knives 114 may be dispensed with.

The arms 155 (e.g. six arms) of the star wheel 154 successively enter between the discs and are provided with cutting means 156 e.g. sharp knives, cutting teeth, diamonds or other means extending radially and projecting into the path of the onions to an adjustable depth e.g. several thousandths of an inch. The notches 26 push the onion against an arm 155 and rotate the star wheel about a shaft 160 supported in bearing blocks 161 secured to the frame of the machine which is restrained frictionally against free rotation by two blocks 162, 163 of, for example, a resin bonded laminated material clamped by screws 164 and nuts 165 about the shaft 160, the block 163 being fixed to the frame of the machine, so that the onion is pressed firmly into the notch. As the onion pushes the arm 155 round the knife blade 156 rides firstly in one direction and then in the other direction over an appreciable part of the circumference of the onion thereby slitting or cutting the skins or inedible layers of the onion. The slit is simultaneously or almost simultaneously given a blast of compressed air or other suitable medium to loosen the skins or inedible layers, from an opening or nozzle 157 in the arm which may be at a larger radius than the knife blade 156 and for example is three sixteenths of an inch to one quarter inch in length radially and 15 to 20 thousandths of an inch wide. Alternatively the opening may be of sufficient length and width that the knife blade 156 may be attached to the arms at the ends of the opening and air may be emitted from both sides of the knife blade 156. Air is conducted to the openings from the hub 158 of the star wheel which is provided with six bores 159 to receive the compressed air from a rotary valve (not shown) which directs the air successively to the openings in the arms. A pressure of air of 60 to 100 lbs. per square inch is usually adequate but a reducing valve may be provided whereby the pressure can be speedily adjusted from any given maximum. The rotary valve contains a flat disc (not shown) which is pressed by a spring (not shown) against the hub 158 of the star wheel. This disc however is cut out to form an aperture extending between 10° and 315° e.g. 60° over the path of the open ends of the bores in the hubs of the star wheel. Thus as the hub is rotated compressed air is successively admitted to the bores during 60° of rotation and shut off from compressed air supply during the remainder of the rotation. The disc may have its opening adjustable or the disc may be replaced by a disc with an opening of a different size.

An alternative embodiment of the apparatus 116 comprises a vertical axle mounted in bearings and rotated by suitable drive means coupled to the electric motor 17 and synchronized with the aforementioned drive means of the onion carrier 111. The upper part of this axle is provided with a plurality of vertical bores e.g. five, in circular array each of which connects with an outwardly extending radial bore which breaks through the circular surface of the axle. Each radial bore is provided with a nozzle or jet having one or more jet outlets. Surrounding this upper end of the axle and fixed to it is a turret or turntable formed with e.g. five circular cups or containers. The axle rotates continuously but if desired it could be arranged to rotate step by step. One nozzle projects through the wall of each container. The container is large enough to receive an onion and permit it to spin round freely. Thus for pickling onions (between 20 and 45 mm. diameter) each container may be 2.4 to 2.8 (e.g. two and five eighths) inches diameter, and 2.3 to 2.7 inches (e.g. 2.5 inches) deep. The container may be cylindrical or may have a larger internal diameter between its ends so that the onions tend to remain in the large diameter part while being skinned. The onions will rotate about the axis of the container and also about their own axes and they tend to remain with their axes about parallel to the axis of the container so that the air blast is directed against the loosened skins and/or inedible layers between the top and tail positions. The generatrix of the container may be a curve or may consist of two straight lines with another shape at their adjacent ends. The containers may be of funnel shape at the top to facilitate introduction of the onions. While the cross section of the container is preferably a circle at all positions it could be of other shape e.g. a polygon or oval.

The top of the axle is flat and over the top end of the axle is fixed a rotary valve which is supplied with compressed air and contains a flat disc which is pressed by a spring against the flat top end of the axle. This disc however is cut out to form an aperture extending 72° over the path of the upper open ends of the vertical holes in the axle. Thus as the axle rotates compressed air is successively admitted to the holes during 72° of rotation and shut off from compressed air during the remainder of the rotation. The disc may have its opening adjustable or the disc may be replaced by a disc with an opening of different size (i.e. the blast can be made available for any specified angle).

The containers pass successively through an onion feeding position where a chute supplies the onions which have been treated as hereinbefore described.

The bottom of the containers is a fixed plate which covers only four containers so that the containers successively reach a position which is open at the bottom to permit the onion to fall out into a chute or on to a conveyor.

Thus the five containers at any one moment are successively serving the following purpose viz (1) receiving an onion (2) subjecting the onion to an air blast thereby making it spin and in so doing removing the loosened skins or inedible layers (3) and (4) permitting the onion to stop spinning, the air blast being cut off or alternatively performing further blasting and (5) allowing the onion together with the skins or inedible layers to fall out. Each container moves successively through these five positions.

Thus the apparatus provides various adjustments for dealing with different varieties of onions viz (1) time factor adjustment by adjusting the speed of movement of the cups through the periods of operation (2) time factor of period of compressed air entering the container; (3) pressure of air; (4) volume of air adjusted by number and size of jets; (5) shape and direction of the jets. If desired two or more jets may be arranged to change the speed or direction of rotation of the onion during the skinning operation.

An advantage of skinning onions according to the present invention is that the onions do not require any prior preparation such as drying or grading. Although it is considered that the efficiency of the apparatus described may be improved by pre-drying and pre-grading. With respect to the latter, there is the additional advantage that the onions are handled and graded with their skins on rather than when the skins have been removed thereby reducing the risk of the onions being contaminated.

I claim:
1. A method of removing skins and/or inedible layers of onions comprising subjecting the onions to a blast of fluid in the form of at least one stream of fluid entering a container in which the onions are placed characterised by splitting said skins and/or layers before subjecting them to the action of the fluid and controlling the feeding of the onions in timed relation with the emptying of the container in such manner that only one or very few onions are introduced into the container on each occasion, the container being open to the escape of fluid and much larger than the onion content therein so that the onion content is free to move in the container solely, apart from the natural force of gravity, according to the influence of the fluid thereon and the containment of the container whereby the onion skins are removed without damage to the remainder of the onion.

2. A method as claimed in claim 1 wherein the skin of each onion is split substantially by cutting from top to tail before being placed in the container.

3. A method as claimed in claim 1 wherein the skin of the onion is split around part or all the largest circumference of the body of the onion before being placed in the container.

4. A method as claimed in claim 1 wherein a stream of fluid is directed against the split for loosening the skin before entry into the container.

5. A method as claimed in claim 1 wherein each onion is topped and tailed before being placed in the container.

6. A method as claimed in claim 1 wherein the fluid is air at ambient temperature.

References Cited

UNITED STATES PATENTS

| | | | |
|---|---|---|---|
| 2,445,881 | 7/1948 | Hemmeter | 146—43 |
| 2,564,916 | 8/1951 | Nemir | 146—32 |
| 2,766,794 | 10/1956 | Odale | 146—43 X |
| 3,326,256 | 6/1967 | Moxley et al. | 146—32 X |

W. GRAYDON ABERCROMBIE, Primary Examiner

U.S. Cl. X.R.
146—32, 43, 49, 241